United States Patent
Kundu et al.

(10) Patent No.: US 10,415,742 B2
(45) Date of Patent: Sep. 17, 2019

(54) SMARTPHONE MONOPOD WITH USE RESTRICTION ENFORCEMENT

(71) Applicant: INTERNATIONAL BUSINESS MACHINES CORPORATION, Armonk, NY (US)

(72) Inventors: Ashish Kundu, Elmsford, NY (US); Amit A. Nanavati, New Delhi (IN); Clifford A. Pickover, Yorktown Heights, NY (US); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/826,960

(22) Filed: Nov. 30, 2017

(65) Prior Publication Data

US 2019/0162359 A1 May 30, 2019

(51) Int. Cl.
*F16M 11/00* (2006.01)
*F16M 11/28* (2006.01)
(Continued)

(52) U.S. Cl.
CPC .............. *F16M 11/28* (2013.01); *G03B 7/00* (2013.01); *G03B 17/38* (2013.01); *G03B 17/561* (2013.01);
(Continued)

(58) Field of Classification Search
CPC ............................ G03B 17/561; G03B 17/563
(Continued)

(56) References Cited

U.S. PATENT DOCUMENTS

| 9,170,473 | B1 | 10/2015 | Li | |
|---|---|---|---|---|
| 2008/0117328 | A1* | 5/2008 | Daoud | ................... F16M 11/10 348/373 |

(Continued)

FOREIGN PATENT DOCUMENTS

| CN | 201242805 | 5/2009 |
|---|---|---|
| CN | 103686601 | 3/2014 |

(Continued)

OTHER PUBLICATIONS

Q. Hardy, "Mapping Our Interiors", https://bits.blogs.nytimes.com/2014/05/18/mapping-our-interiors/, New York Times, May 2014, pp. 1-3.

(Continued)

*Primary Examiner* — Steven M Marsh
(74) *Attorney, Agent, or Firm* — F. Chau & Associates, LLC (57) ABSTRACT

A photographic monopod includes an extendable shaft, a bracket for fixing a photographic device at a first end of the extendable shaft, and a grip at a second end of the extendable shaft. The grip is opposite to the first end of the extendable shaft. The photo graphic monopod further includes a shutter control switch for controlling a shutter of the photographic device, and a shaft extension sensor for sensing a degree to which the extendable shaft is extended. The photographic monopod additionally includes a logic circuit for receiving the degree to which the extendable shaft is extended from the shaft extension sensor and disabling a connection between the shutter control switch and the photographic device when the degree to which the extendable shaft is extended exceeds a threshold.

21 Claims, 10 Drawing Sheets

(51) Int. Cl.
G03B 17/56 (2006.01)
G03B 7/00 (2014.01)
H04W 4/021 (2018.01)
G03B 17/38 (2006.01)
H04W 4/70 (2018.01)
H04W 4/80 (2018.01)

(52) U.S. Cl.
CPC .......... *G03B 17/563* (2013.01); *H04W 4/021* (2013.01); *H04W 4/70* (2018.02); *H04W 4/80* (2018.02)

(58) Field of Classification Search
USPC ......... 248/177.1, 125.1, 125.2, 125.8, 178.1; 294/139
See application file for complete search history.

(56) References Cited

U.S. PATENT DOCUMENTS

| | | | | |
|---|---|---|---|---|
| 2009/0003822 | A1* | 1/2009 | Tyner | F16M 11/32 396/428 |
| 2013/0010186 | A1* | 1/2013 | Scarola | F16M 11/28 348/376 |
| 2013/0233988 | A1* | 9/2013 | Johnson | G03B 17/561 248/229.14 |
| 2015/0316837 | A1* | 11/2015 | Maltese | F16M 13/04 294/139 |
| 2017/0363935 | A1* | 12/2017 | Zimmermann | H04N 5/2252 |

FOREIGN PATENT DOCUMENTS

| | | |
|---|---|---|
| CN | 104318712 | 1/2015 |
| CN | 204244305 | 4/2015 |
| CN | 204459699 | 7/2015 |
| CN | 104836874 | 8/2015 |
| CN | 104883422 | 9/2015 |
| CN | 105042304 | 11/2015 |

OTHER PUBLICATIONS

M. Wollan, "How to Survive a Stampede", https://www.nytimes.com/2015/11/15/magazine/how-to-survive-a-stampede.html, Nov. 2015, pp. 1-2.
R. Graham, "The Hajj Stampede: Why Do Crowds Run?", https://www.theatlantic.com/international/archive/2015/09/hajj-stampede-crowd-disasters/407542/, Sep. 2015, pp. 1-4.
D. Helbing, "Agent-Based Simulations and Experiments to Study Emergent Social Behavior", Feb. 2012.
M. Baig et al., "Crowd Emotion Detection Using Dynamic Probabilistic Models", 2014, abstract, pp. 1-6.
https://en.wikipedia.org/wiki/Near-field_communication, "Near-field Communication", pp. 1-14.
https://en.wikipedia.org/wiki/Bluetooth, "Bluetooth", pp. 1-24.
Schavemaker et al., "SWEET demonstrator: a crowd emotion monitor", Measuring Behavior 2018, 2014, pp. 1-6.

* cited by examiner

SMARTPHONE MONOPOD WITH USE RESTRICTION ENFORCEMENT

BACKGROUND

1. Technical Field

The present disclosure relates to a smartphone monopod and, more specifically, to a smartphone monopod capable of enforcing restrictions on use.

2. Discussion of Related Art

A selfie stick is monopod used by a user to take a picture of oneself (e.g., a "selfie") by positioning a smartphone or camera beyond the average range of an arm. The monopod typically will have a metal rod that is usually extendable, with a handle at one end and an adjustable clamp at the other end to hold a user's phone in place. Many selfie sticks have a remote or Bluetooth controls to enable a user to take a picture. As selfie sticks became more and more popular, safety concerns and inconveniences of the product towards others resulted in their being banned in many venues.

Many of these venues are places where guests often like to take pictures of the venue itself and take pictures of themselves. Due to the selfie stick bans and restrictions the related safety issues and inconveniences are eliminated. However, visitors are unable to take selfies with a selfie stick while in these restricted venues.

BRIEF SUMMARY

According to an exemplary embodiment of the present inventive concept, a photographic monopod is provided. The photographic monopod includes an extendable shaft, a bracket for fixing a photographic device at a first end of the extendable shaft, and a grip at a second end of the extendable shaft. The grip is opposite to the first end of the extendable shaft. The photo graphic monopod further includes a shutter control switch for controlling a shutter of the photographic device, and a shaft extension sensor for sensing a degree to which the extendable shaft is extended. The photographic monopod additionally includes a logic circuit for receiving the degree to which the extendable shaft is extended from the shaft extension sensor and disabling a connection between the shutter control switch and the photographic device when the degree to which the extendable shaft is extended exceeds a threshold.

In an exemplary embodiment of the present inventive concept, the shutter control switch is disposed on the grip.

In an exemplary embodiment of the present inventive concept, the photographic monopod further includes a proximity sensor configured to measure a density of individuals proximate to the photographic monopod and to transmit the measured density to the logic circuit. The logic circuit is further configured to disable the connection between the shutter control switch and the photographic device when the measured density exceeds a predetermined crowd pressure threshold.

In an exemplary embodiment of the present inventive concept, the shaft extension sensor includes a potentiometer.

In an exemplary embodiment of the present inventive concept, the shutter control switch is paired to the photographic device via a wireless connection and the shutter control switch controls the shutter of the photographic device via the wireless connection.

In an exemplary embodiment of the present inventive concept, the threshold is received by the logic circuit over a wireless connection.

In an exemplary embodiment of the present inventive concept, the threshold is transmitted by a facility within which the photographic monopod is located.

In an exemplary embodiment of the present inventive concept, the threshold is received by the logic circuit from the photographic device.

In an exemplary embodiment of the present inventive concept, the threshold is received by the logic circuit from a device installed within a facility that the photographic monopod is operated within.

In an exemplary embodiment of the present inventive concept, the photographic device is a smartphone.

In an exemplary embodiment of the present inventive concept, the photographic device further includes a geolocation device for determining a present geolocation of the monopod, wherein the logic circuit selects the threshold based on the present geolocation of the monopod as determined by the geolocation device.

In an exemplary embodiment of the present inventive concept, the geolocation device is disposed within the photographic device.

According to an exemplary embodiment of the present inventive concept, a photographic monopod is provided. The photographic monopod includes an extendable shaft, a bracket for fixing a photographic device at a first end of the extendable shaft, and a grip at a second end of the extendable shaft. The grip is opposite to the first end of the extendable shaft. The photographic monopod further includes a shaft extension sensor for sensing a degree to which the extendable shaft is extended. The photographic monopod additionally includes a logic circuit for receiving a threshold value, receiving the degree to which the extendable shaft is extended from the shaft extension sensor, and generating an alert when the degree to which the extendable shaft is extended exceeds the received threshold value.

In an exemplary embodiment of the present inventive concept, the logic circuit receives the threshold value over a wireless connection.

In an exemplary embodiment of the present inventive concept, the logic circuit receives the threshold value via a manual input.

In an exemplary embodiment of the present inventive concept, the logic circuit receives the threshold value based on a present geolocation of the photographic monopod.

In an exemplary embodiment of the present inventive concept, the logic circuit additionally locks the extendable shaft from extending further when the degree to which the extendable shaft is extended exceeds the received threshold value.

In an exemplary embodiment of the present inventive concept, the logic circuit additionally prevents the photographic device from capturing an image when the degree to which the extendable shaft is extended exceeds the received threshold value.

According to an exemplary embodiment of the present inventive concept, a method for controlling a camera function within a smartphone is provided. The method includes mounting the smartphone to an end of an extendable shaft and sensing an extent to which the extendable shaft has been extended. The method further includes transmitting an indication of the extent to which the extendable shaft has been extended to a logic circuit of the extendable shaft. The method additionally includes preventing the smartphone from capturing an image when it is determined, by the logic circuit, that the extent to which the extendable shaft has been extended exceeds a threshold.

BRIEF DESCRIPTION OF THE SEVERAL VIEWS OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

One or more exemplary embodiments of the present inventive concept provide photographic monopod and a photographic device attached to the monopod. The monopod includes a means of triggering the photographic device to take a photo. The monopod may receive instructions and take a protective action such as disabling its photo triggering function. According to an exemplary embodiment, instructions may be received by the photographic monopod through, for example, a wireless connection. The photographic monopod may result in venues where selfie sticks are banned allowing selfie sticks to be used in certain parts of the venue.

One or more exemplary embodiments of the present inventive concept provide a method of controlling a camera function within a smartphone. According to an exemplary embodiment, data is transmitted to a logic circuit. The logic circuit may then determine whether the smartphone should be prevented from capturing an image.

Exemplary embodiments of the present invention will be described more fully hereinafter with reference to the accompanying drawings. Like reference numerals may refer to like elements throughout the specification and drawings.

Figure 1:
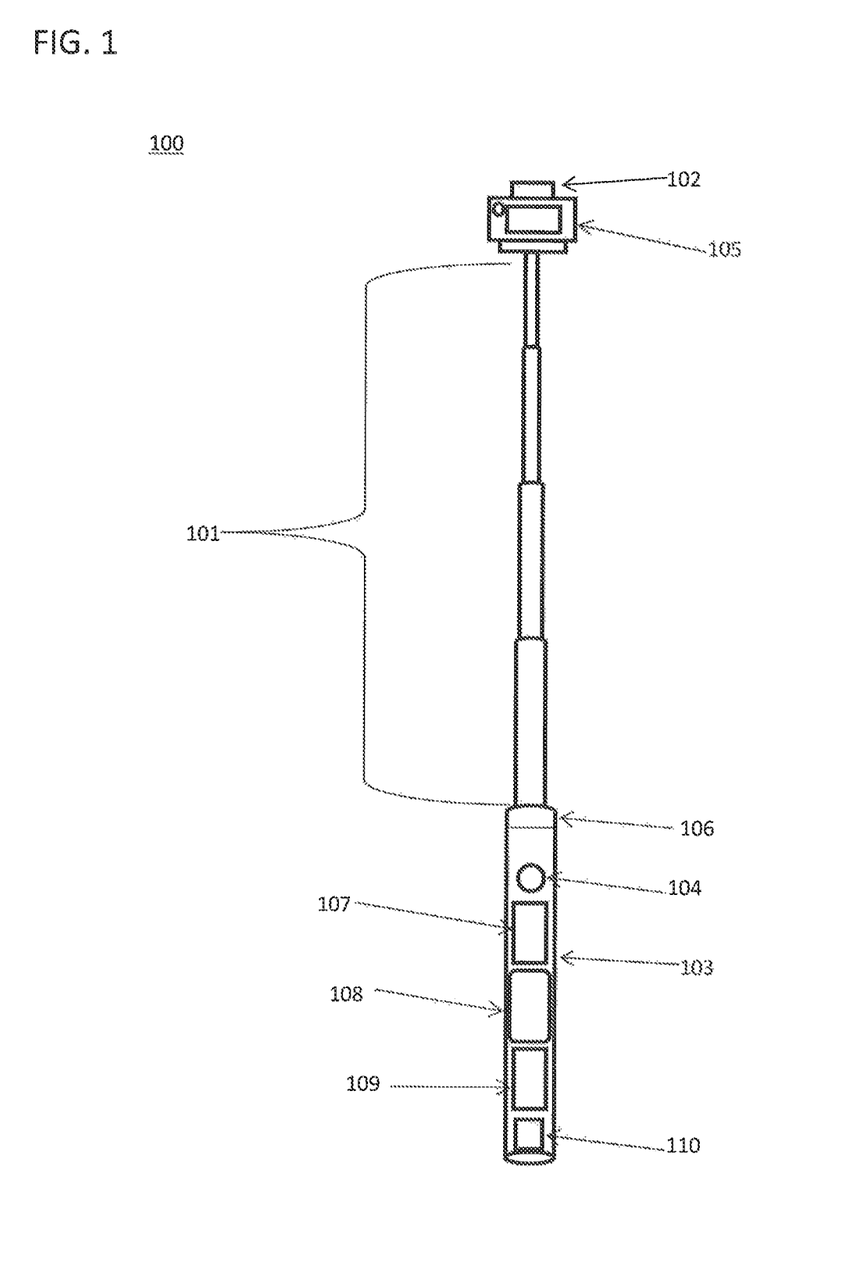
FIG. 1 shows a diagram of a photographic monopod according to an exemplary embodiment of the present inventive concept.

FIG. 1 shows a diagram of a photographic monopod 100 according to an exemplary embodiment of the present inventive concept. The photographic monopod 100 may include an extendable shaft 101, a bracket 102, a grip 103, a shutter control switch 104, an extension sensor 106 and a sensor circuit 110.

The extendable shaft 101 may be made of metal and may include multiple cylindrical sections (e.g., four sections) attached to each other. Further, the photographic monopod 100 made of a flexible material such as a plastic. Each section may be smaller in diameter than the previous section and is capable of either extending from its previous section or collapsing within its previous section. For example, the extendable shaft 101 may be a telescoping supporting rod.

The bracket 102 may be disposed at one end of extendable shaft 101 and may be used to fix a photographic device 105 therein. For example, the bracket 102 may be placed at the end of the extendable shaft 101 with the smallest diameter. The photographic device 105 may be a smartphone.

The grip 103 may be disposed at another end of the shaft 101 opposite to the bracket 102. For example, the grip 103 may be disposed at the end of the shaft 101 with the greatest diameter. The grip 103 may be made of rubber or synthetic rubber materials.

In exemplary embodiments, the interior of the shaft 101 where the grip 103 is disposed may include a rechargeable battery and a USB charging interface.

In addition, the shutter control switch 104 may be used for controlling a shutter of the photographic device 105. Where the photographic device 105 is a smartphone having an integrated camera, and a smartphone camera may lack an actual shutter, the use of a shutter control switch is used metaphorically to describe the act of capturing an image. Further, the shutter control switch 104 may be disposed on the grip 103 or close to the grip 103. The shutter control switch 104 may be paired or otherwise connected to the photographic device 105 through a wireless connection. The shutter control switch 104 may control the shutter of the photographic device through a wireless connection. The wireless connection may be, for example, a Bluetooth connection.

In exemplary embodiments, the photographic device could be triggered to take a photo by an acoustic signal, a gesture, a timer, etc.

The photographic monopod 100 may further include a shaft extension sensor 106. The shaft extension sensor 106 may sense a degree to which the extendable shaft 101 is extended. For example, the shaft extension sensor 106 may include a measuring wheel. The shaft extension sensor 106 may include a potentiometer. The shaft extension sensor 106 may be disposed above the grip 103 and may also be disposed on the shaft 101. In an exemplary embodiment, there may be at least one shaft extension sensor 106 on the extendable shaft 101. However, the present disclosure is not limited thereto. For example, there may be a plurality of shaft extension sensor on the extendable shaft 101.

The photographic monopod 100 may include a sensor circuit 110. The sensor circuit 110 may be configured to detect when the monopod 100 is near a particular object that may be restricted from monopods. The detection of being in close proximity of the restricted object may result in the monopod 100 vibrating, a light on the monopod flashing, and/or the camera function being disabled. The sensor circuit 110 may include a radio-frequency identification (RFID) circuit or near field communication (NFC) circuit. Further, the Bluetooth radio of the monopod 100 may be used to detect when the monopod 100 is in proximity of the restricted object. For example, the restricted object may utilize a Bluetooth Low Energy (BTLE) beacon.

Referring back to the grip 103; the grip 103 may include selection buttons 107-1 and 107-2 and a display 108. The selection buttons 107-1 and 107-2 may be used to navigate through a user interface displayed on the display 108 and input data. The display 108 may be, for example, a liquid-crystal display (LCD). The display 108 may also indicate crowd density, crowd pressure, or the density of other stick users in a region of space. Crowd pressure (crowd density multiplied with the variance of speeds in the crowd) is a variable that is considered by a logic circuit 405 (e.g., as illustrated in FIG. 4) to make a determination regarding the functionality of the photographic monopod, such as, disabling the photographic monopod 100. In an exemplary embodiment, the grip 103 may further include a panic button to help report an incident.

Figure 2:
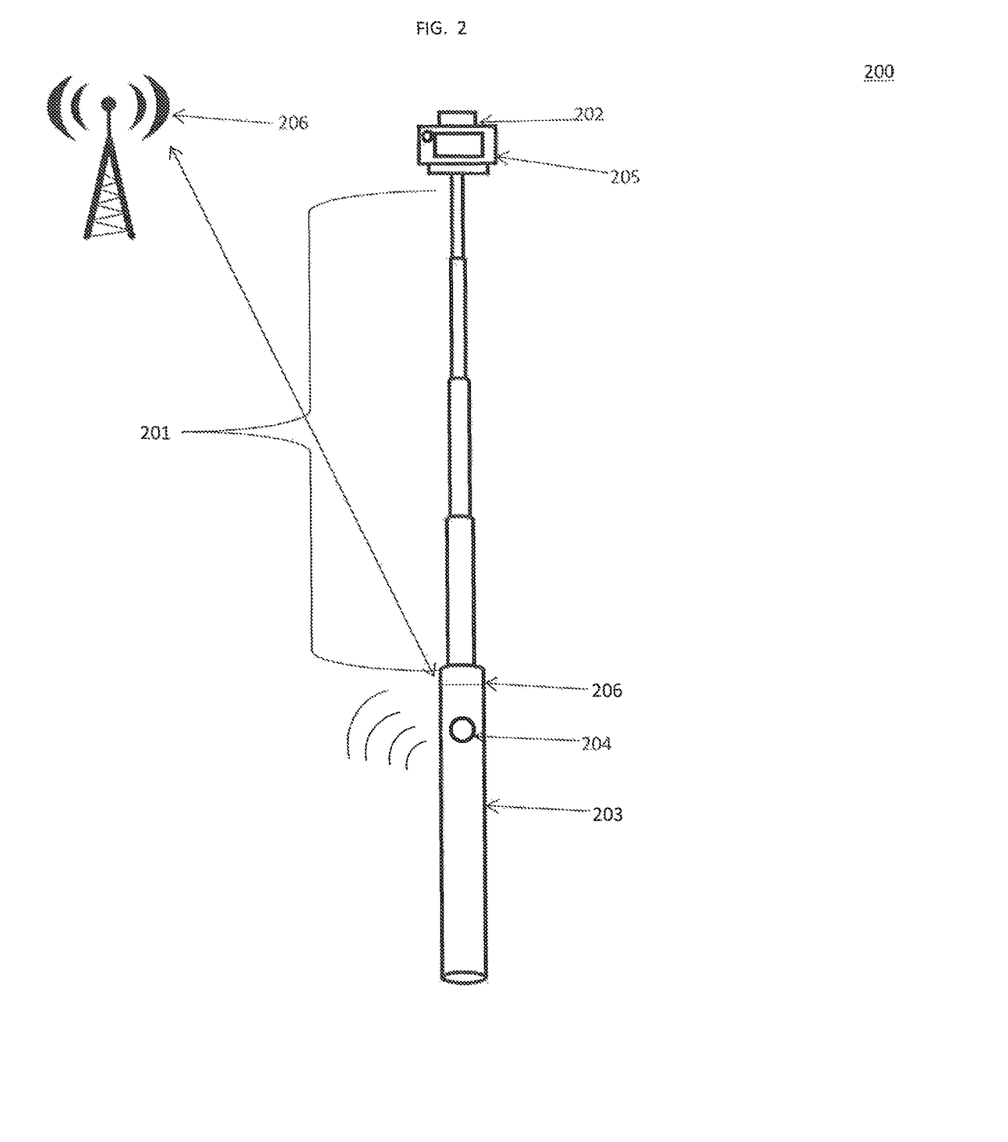
FIG. 2 shows a diagram of a photographic monopod according to an exemplary embodiment of the present inventive concept.

FIG. 2 shows a diagram of a photographic monopod 200 according to an exemplary embodiment of the present inventive concept. The photographic monopod 200 is substantially similar to the photographic monopod 100 of FIG. 1 and for convenience, only the differences will be discussed. Here, the photographic monopod 200 is receiving instructions over a wireless network from a wireless communication device 208 (e.g., a server). The instructions may be threshold data received by a logic circuit 405 (e.g., as illustrated in FIG. 4). The logic circuit 405 may be disposed in the interior of the shaft 101 where the grip 203 is disposed (e.g., as illustrated in FIG. 4). The grip 203 may further include a speaker 207 for generating an audible alarm based on determinations made by the logic circuit 405.

In an exemplary embodiment, the photographic monopod 200 may be automatically registered over a wireless network as it enters a restricted area and the photographic monopod 200 may be addressable thereby. This function may aid users in crowded situations, such as museums and concerts. For example, authorities can send personalized messages to the photographic monopod indicating how the user should move or position themselves. For example, the messages may be "exit through the gate on your left", disable camera, etc. In addition, the instructions may be based on a real time assessment of crowd density. For example, the monopod 200 cannot be used when crowd density is greater than 3 people per square yard. In addition, the instructions or data may be available online and the monopod may disclose its location to receive the instructions. Further, instructions may be based on a real-time assessment of how many individuals are using a photographic monopod 200 receiving crowd related data in an area. This may greatly reduce the chances of a stampede or an injury in crowded situations.

In an exemplary embodiment, the photographic monopod 200 may receive messages informing the user of nearby locations where the monopod 200 is allowed and where crowd density is low. For example, if a crowd density is very low in one area of a venue, the monopod 100 may state, "If you go to room A, selfie-stick use will be allowed now." Further, the photographic monopod 200 may join the network of Internet of Things (IoT) enabled devices or access data of devices in a proximity.

Figure 3:
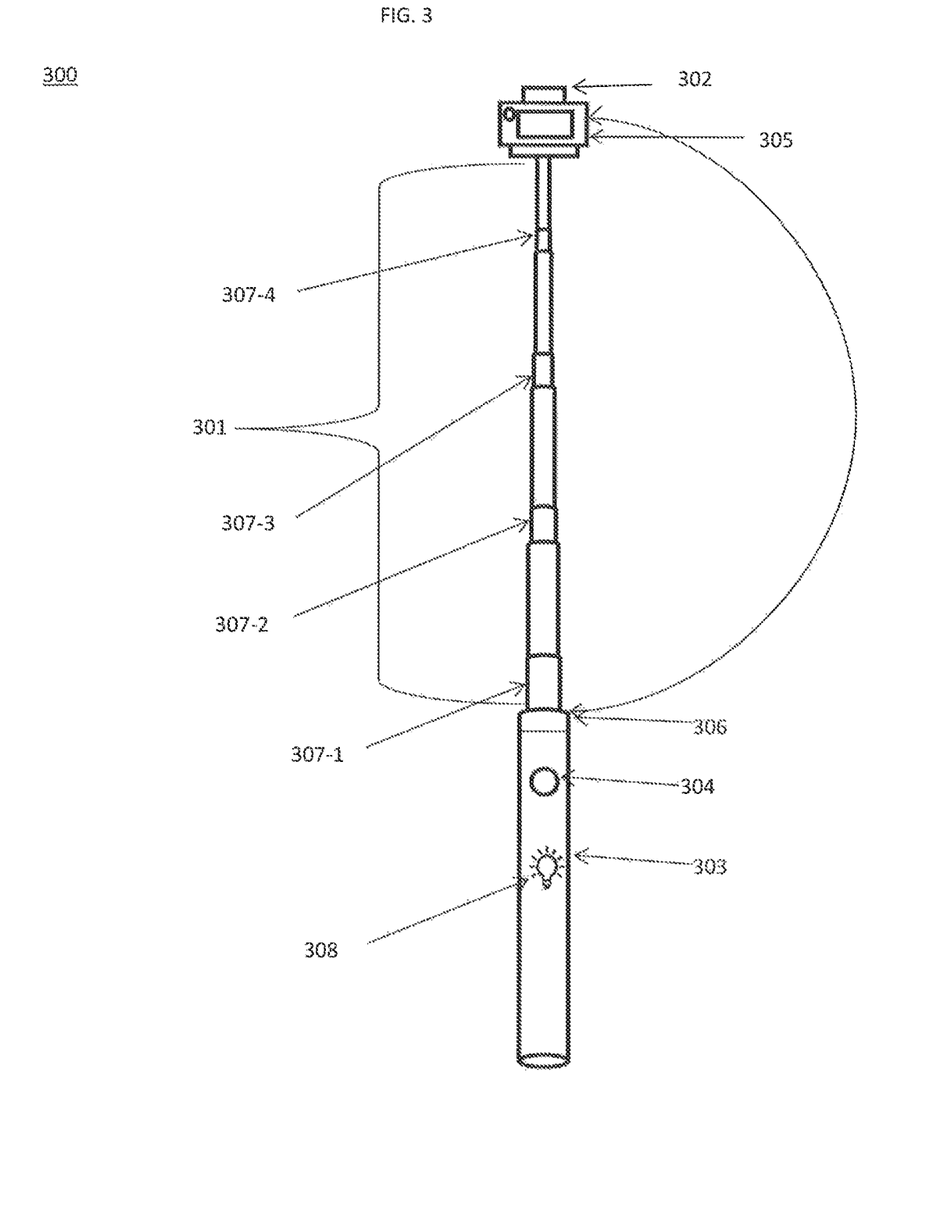
FIG. 3 shows a diagram of a photographic monopod according to an exemplary embodiment of the present inventive concept.

FIG. 3 shows a diagram of a photographic monopod 300 according to an exemplary embodiment of the present inventive concept. The photographic monopod 300 is substantially similar to the photographic monopod 100 of FIG. 1 and for convenience, only the differences will be discussed. Here, the photographic monopod 300 is receiving instructions from the photographic device 305. The instructions may be sent through wireless communication such as a Bluetooth connection, Wi-Fi, and near field communication (NFC). The instructions being sent may be threshold data.

The photographic monopod 300 may include locking mechanism 107 for locking the extendable shaft 301 from extending further based on a determination by the logic circuit 704 (e.g., will be discussed later with regard to FIG. 7). There may be multiple locking mechanisms 107-1 to 107-4 disposed on the extendable shaft 301. For example, each locking mechanism 107-1 to 107-4 may be disposed on each section of the extendable shaft 301.

The photographic monopod 300 may further include a light 308. The light 308 may function as indicator based on the determination by the logic circuit. For example, the light 308 may illuminate red to show that the photographic monopod 300 should not be used. The light 308 may illuminate yellow to indicate that photographic monopod 300 may be used when, for example, certain subject matter is in view or a user is in a certain location. The light 308 may illuminate green to indicate that the photographic monopod 300 is allowed to be used. For example, the light 308 may blink or stay on until a condition has changed. For example, if the photographic monopod is not allowed to be used in an area, the light 308 may blink red or stay illuminated red until the user has left the area. This function enables a user to proceed with caution and withdraw their selfie sticks in areas where the sticks are restricted.

Figure 4A:
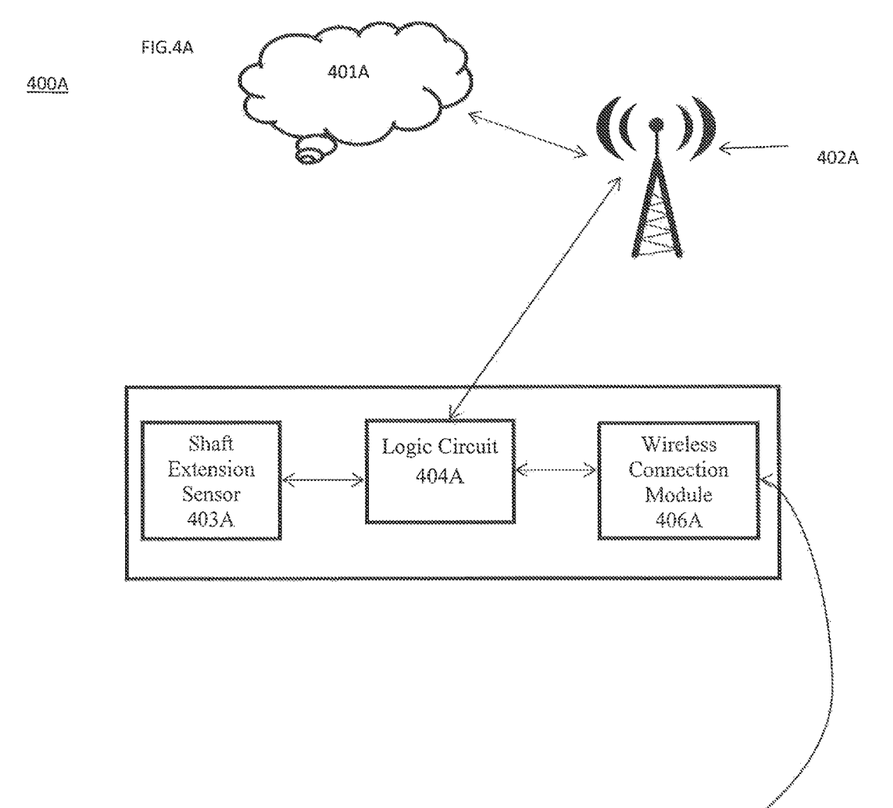
FIG. 4A shows a block diagram of a section of photographic monopod receiving instructions through a wireless connection according to an exemplary embodiment of the present inventive concept.

FIG. 4A shows a block diagram of a section 405A of photographic monopod receiving instructions through a wireless connection according to an exemplary embodiment of the present inventive concept. The section 405A of the photographic monopod may be where the grip 405A is disposed. The section 405A may include a shaft extension sensor 403A, a logic circuit 404A and a wireless connection module 406A. The above mentioned components may be housed in the interior of the shaft 101 where the grips is disposed The shaft extension sensor 403A may sense the degree to which the extendable shaft 101 (e.g., as illustrated in FIG. 1) is extended. The sensed degree may then be sent to the logic circuit 404A.

Figure 4B:
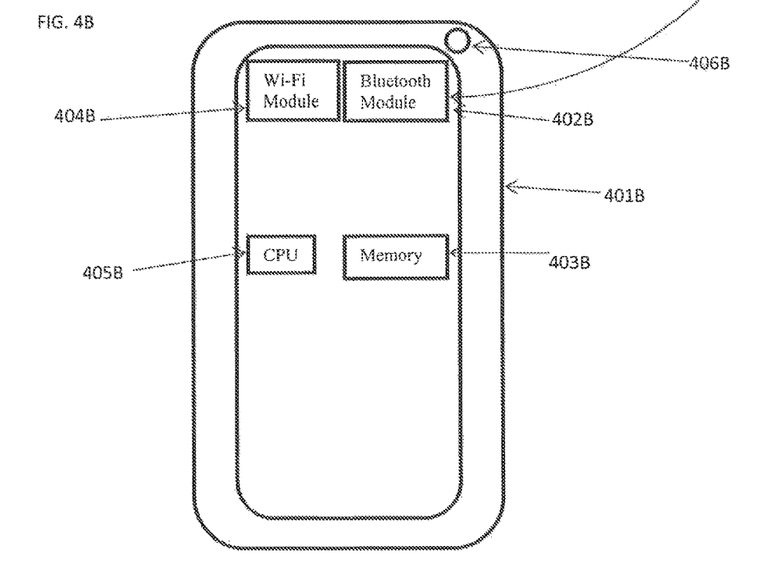
FIG. 4B shows a photographic device according to an exemplary embodiment of the present inventive concept.

The logic circuit 404A may make a determination based on the received sensed degree and instructions received from a cloud server 401A through a wireless communication device 402A. The instructions received may be threshold data. The determination may be to disable the connection between the shutter control switch 104 and the photographic device 105. The determination may be sent to the wireless communication module 406A. The wireless module may be capable, for example, of establishing and maintaining a Bluetooth connection or a Wi-Fi connection. The wireless module 406A may also be in communication the photographic device 105 such as a camera or camcorder or a smartphone or tablet computer 401B as illustrated in FIG. 4B. However, for the purposes of providing a clear disclosure, a camera, a camcorder, a smartphone, and a tablet computer may all be referred to as photographic devices 105.

For example, the shaft extension sensor 403A may measure the length to which the extendable shaft 101 is extended so that the logic circuit 404A may determine whether the measured length of extension meets or exceeds the threshold value. For example, where the shaft sensor 403A measures the length of extension of the extendable shaft to be 20 inches and the threshold value is 19 inches, the logic circuit 404A may determine that the threshold has been violated. The threshold value may be sent to the logic circuit 404A from the cloud server 401A. After determining that the threshold has been violated, the logic circuit 404A may take remedial action, for example, by disabling the connection between the shutter control switch 104 and the photographic device 105 until the user has retracted the extendable shaft 101 to the point where the threshold is no longer violated. Thereafter, the logic circuit 404A may re-enable the disabled connection.

In an exemplary embodiment, the photographic monopod 100 may receive compliance instructions through the wireless connection. For example, a museum may broadcast a signal that selfie sticks cannot be used in the room with a particular painting, between 2:00 pm and 4:00 pm or when crowd density exceeds a threshold. For example, the compliance instructions may be received by the logic circuit 404A. The instructions may also be displayed on the display 108 of the monopod.

In an exemplary embodiment, the logic circuit may also use threshold data based on crowd density and risk calculations (e.g., consideration of ceilings, nearby users, nearby amusement park rides, etc.) to make determinations.

FIG. 4B shows a photographic device 401B according to an exemplary embodiment of the present inventive concept. The photographic device 401B may be, for example, a smartphone. The photographic device 401B may include a Bluetooth module 402B, a Wi-Fi module 404B, a Central Processing Unit (CPU) 405B, a memory 403B and a camera 406B.

The Bluetooth module 402B and the Wi-Fi module 404B may be used to communicate with the wireless connection module 406 of the photographic monopod.

Figure 5:
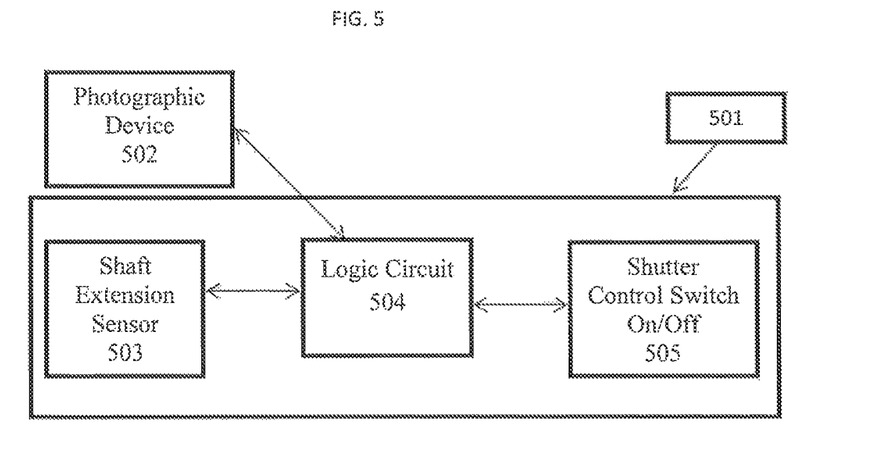
FIG. 5 shows a block diagram of a section of photographic monopod receiving instructions from a photographic device according to an exemplary embodiment of the present inventive concept.

FIG. 5 shows a block diagram of a section of photographic monopod receiving instructions from a photographic device according to an exemplary embodiment of the present inventive concept. The section of the photographic monopod may be where the grip 501 is disposed and has substantially the same components illustrated in FIG. 4A. In this exemplary embodiment, the logic circuit 504 receives the degree to which the extendable shaft is extended from the shaft extension sensor 503 and receives threshold data from the photographic device 502. The determination made by the logic circuit may be substantially the same as in FIG. 4A.

Figure 6:
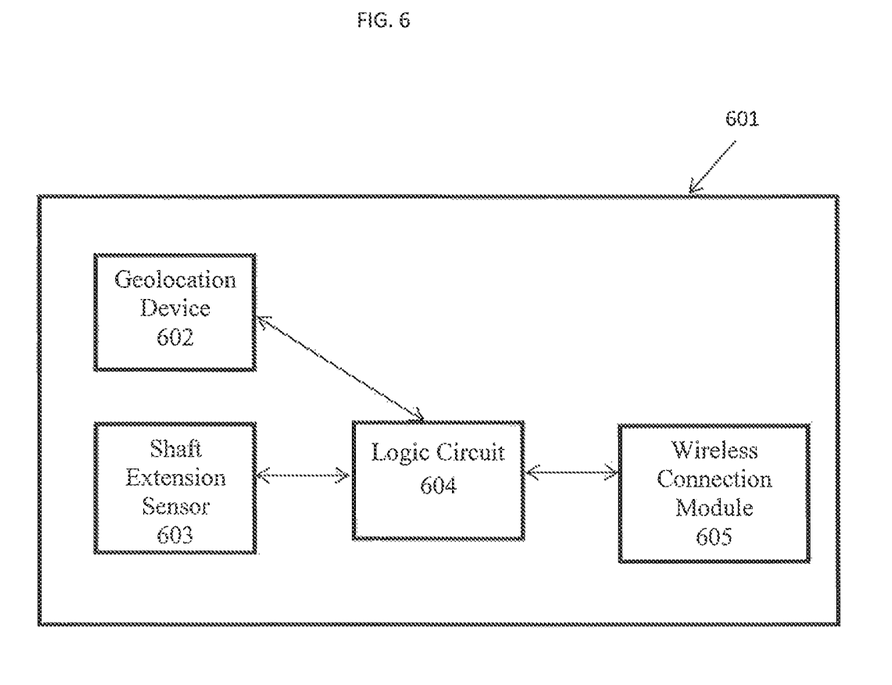
FIG. 6 shows a block diagram of a section of photographic monopod according to an exemplary embodiment of the present inventive concept.

FIG. 6 shows a block diagram of a section 601 of photographic monopod according to an exemplary embodiment of the present inventive concept.

The section 601 of the photographic monopod is substantially similar to the section of FIG. 4A. The section of the photographic monopod may be where the grip is disposed. The section 601 includes a geolocation device 602, a shaft extension sensor 603, a logic circuit 604 and a wireless connection module 605.

In this exemplary embodiment, logic circuit 604 may receive the degree to which the extendable shaft 101 is extended from the shaft extension sensor 603. The geolocation device 602 may determine the present geolocation of the monopod. The present location may be sent to the logic circuit. The logic circuit may select a threshold based on the present geolocation and make a determination with the received degree from the shaft extension sensor 603.

The geolocation device 602 may use a Global Positioning System (GPS) and may include a GPS receiver.

For example, the shaft extension sensor may determine the length of extension of the shaft to be 20 inches. The geolocation device 602 may determine the present geolocation to be within Museum D. The logic circuit may receive the data and may find that Museum D may allow selfie sticks to be extended by no more than 19 inches. The logic circuit will determine that the threshold value has been exceeded (e.g., 20 in.>19 in.) and decide to disable the connection between the shutter control switch 104 and the photographic device 105 in response to the violation of the threshold. The determination may be sent to the wireless connection module 605, which may then interrupt, un-pair, or otherwise disable the wireless connection.

It is to be understood that articulation of the extendable shaft 101 may be performed either manually, for example, by the user pulling the ends of the extendable shaft 101 apart, or articulation may be performed mechanically, for example, using an actuator. In an exemplary embodiment, the extendable shaft 101 may be locked by the logic circuit to prevent a manual extension of the shaft. Where the shaft 101 extends mechanically, articulation beyond the threshold value may be prevented.

Figure 7:
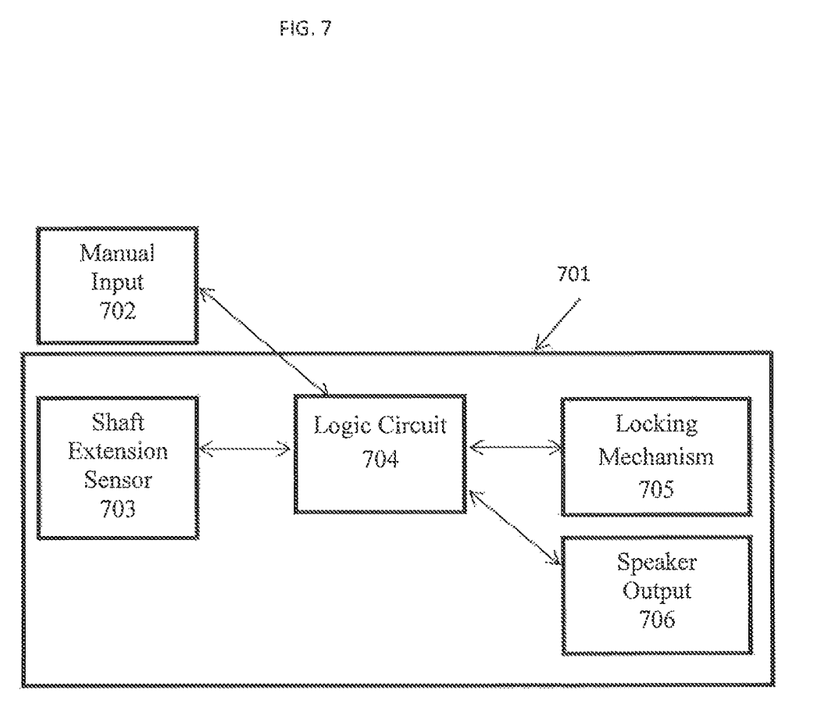
FIG. 7 shows a block diagram of a section of photographic monopod receiving instructions from a manual input according to an exemplary embodiment of the present inventive concept.

FIG. 7 shows a block diagram of a section 701 of photographic monopod receiving instructions from a manual input 702 according to an exemplary embodiment of the present inventive concept. The section 701 of the photographic monopod is the grip 601 of the photographic monopod. The section 701 includes a shaft extension sensor 703, a logic circuit 704, a locking mechanism 705 and a speaker 706.

In this exemplary embodiment logic circuit 704 may receive the degree to which the extendable shaft 101 is extended from the shaft extension sensor 603. The logic circuit 704 may receive a manual input of a threshold from a user through, for example, the selection buttons 107-1 and 107-2 as illustrated in FIG. 1. Based on the received degree and the threshold, the logic circuit may make a determination. The logic circuit may also determine to send a signal to the locking mechanism 705 to lock the extendable shaft 101. The logic circuit may determine to generate an alert through the speaker 706.

For example, the shaft extension sensor 703 may determine that the extension length of the extendable shaft 101 is 20 inches. That determination is then sent to the logic circuit 704. The logic circuit may receive threshold data providing a threshold value of 19 inches. The logic circuit may receive the threshold data, manually, from a user. The logic circuit 704 may then determine that the shaft 101 is extended beyond the 19 inch threshold value (e.g., 20 in.>19 in.) and decide to generate an alarm through the speaker 706 and lock the shaft 101 from extending further in response to the violation of the threshold.

Figure 8:
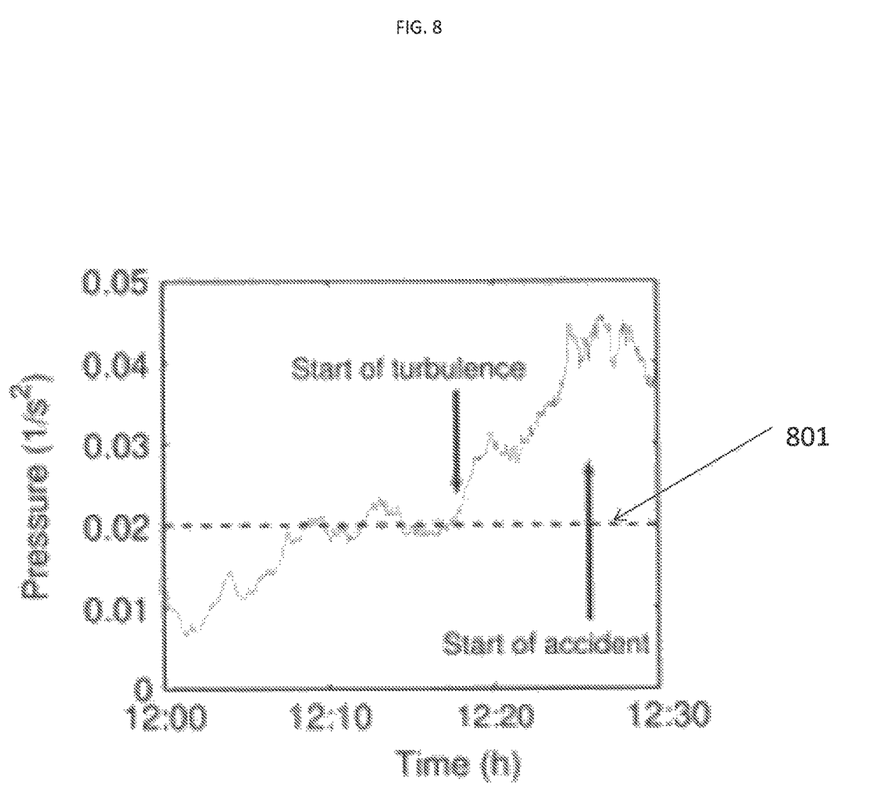
FIG. 8 shows a graph illustrating crowd pressure data.

FIG. 8 shows a graph illustrating crowd pressure data. The graph illustrates crowd pressure over a period of time in a particular region. The x-axis represents pressure ($1/s^2$) (e.g., crowd pressure) and the y-axis represents time (h). The graph indicates as time increases so may the crowd pressure.

A crowd pressure threshold 801 may be set. For example, the threshold 801 may be set at 0.02 1/s². When the pressure crosses the threshold 801, a disaster may occur, e.g., stampede. The threshold 801 may also indicate that the photographic monopods may be dangerous at that level. The crowd pressure data may be sent to the logic circuit. Beyond the threshold 801 the logic circuit may disable the photographic monopod.

In exemplary embodiments, assessments of the crowd pressure can be based on video, audio, floor vibrations, oxygen/$CO_2$ sensors of which may be disposed on either the photographic device or the monopod. The logic circuit may base determinations on data and forecasts of crowd characteristics based on the collected from the sensors to make.

Figure 9:
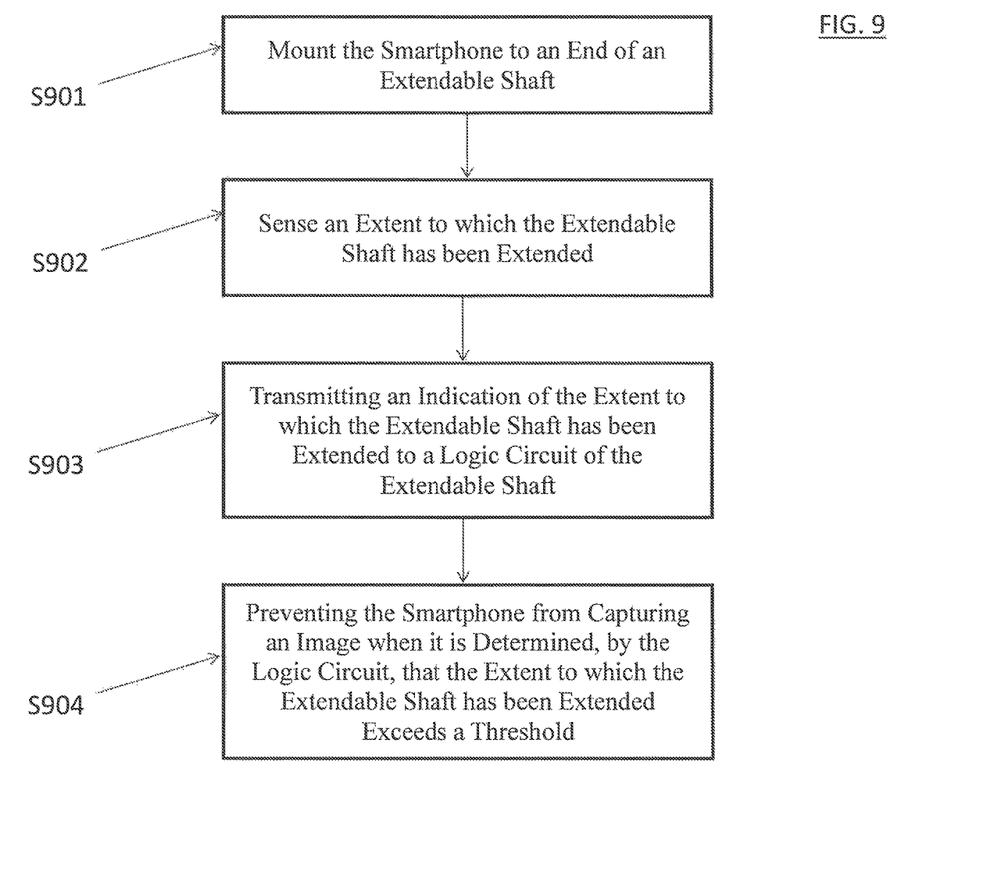
FIG. 9 shows a flowchart of the method of controlling a camera function within a smartphone according to embodiment of the present disclosure.

FIG. 9 shows a flowchart of the method of controlling a camera function within a smartphone according to embodiment of the present disclosure.

According to an exemplary embodiment of the present inventive concept, a method for controlling a camera function within a smartphone is provided. The method includes mounting the smartphone to an end of an extendable shaft (S901) and sensing an extent to which the extendable shaft has been extended (S902). The method further includes transmitting an indication of the extent to which the extendable shaft has been extended to a logic circuit of the extendable shaft (S903). The method additionally includes preventing the smartphone from capturing an image when it is determined, by the logic circuit, that the extent to which the extendable shaft has been extended exceeds a threshold (S904).

In S901, mounting the smartphone to an end of an extendable shaft may include mounting the smartphone on the bracket 102 at the end of the shaft. The extendable shaft 101 may be extended manually (e.g., a user physically extending the shaft) or mechanically. For example, the monopod 100 may include an actuator to extend or retract the extendable shaft 101 at the control of the user. In such a case, extension may be limited by the threshold value and extension beyond the threshold value may be prevented.

However, where extension is manual, in S902, the shaft extension sensor 106 may sense the extent to which the extendable shaft 101 has been extended.

In S903, the shaft extension sensor 106 may transfer an indication of the extent to which the extendable shaft 101 has been extended to the logic circuit 404A of the extendable shaft 101.

In S904, the logic circuit 404A may prevent the smartphone from capturing an image when the logic circuit 404A determines that the extent to which the extendable shaft 101 has been extended is beyond the threshold. In exemplary embodiments, preventing the smartphone from capturing the image may include the logic circuit disabling the connection between the shutter control switch 104 and the smartphone. In an exemplary embodiment, the connection may be disabled by deactivating the wireless connection between the shutter control switch 104 and the smartphone.

In some circumstances, the threshold may be set as zero inches to signify that either selfie sticks, or the use of any photographic device, may be prohibited in the present area. In these instances, image capture may be blocked without regard to the extent of extension of the extendable shaft 101.

The method of controlling a camera function within a smartphone according to embodiments of the present disclosure may accordingly result in the prevention of selfie sticks from being used in restricted areas, and may limit the use of selfie sticks to predetermined lengths of extension that are geographically defined, or otherwise spatially limited.

Figure 10:
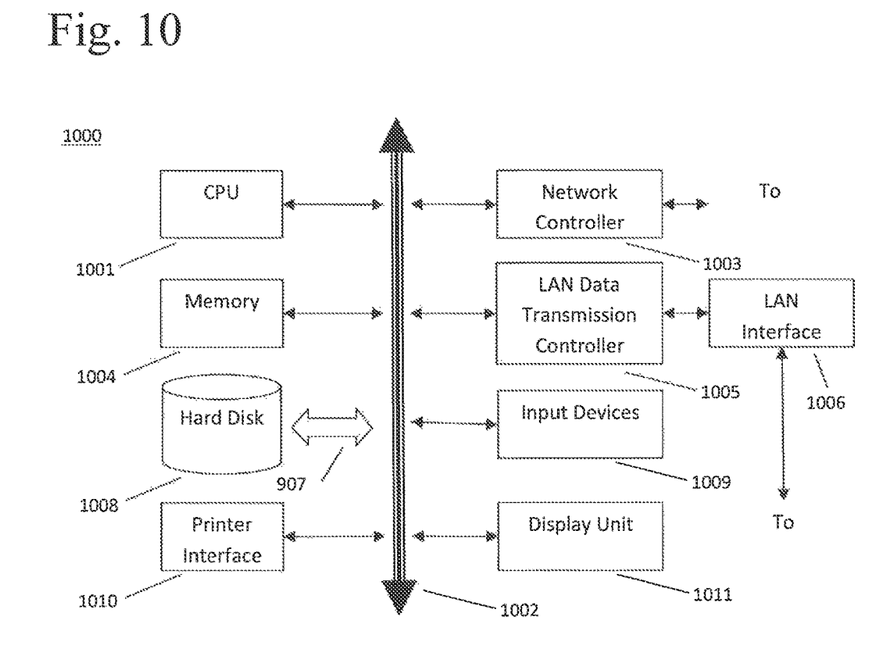
FIG. 10 shows an example of a computer system capable of implementing the method and apparatus according to embodiments of the present disclosure.

FIG. 10 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 900 may include, for example, a central processing unit (CPU) 1001, random access memory (RAM) 1004, a printer interface 1010, a display unit 1011, a local area network (LAN) data transmission controller 1005, a LAN interface 906, a network controller 1003, an internal bus 1002, and one or more input devices 1009, for example, a keyboard, mouse etc. As shown, the system 1000 may be connected to a data storage device, for example, a hard disk, 1008 via a link 1007.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A photographic monopod, comprising:
an extendable shaft;
a bracket for fixing a photographic device at a first end of the extendable shaft;
a grip at a second end of the extendable shaft, opposite to the first end of the extendable shaft;
a shutter control switch for controlling a shutter of the photographic device;
a shaft extension sensor for sensing a degree to which the extendable shaft is extended; and
a logic circuit for receiving the degree to which the extendable shaft is extended from the shaft extension sensor and disabling a connection between the shutter control switch and the photographic device when the degree to which the extendable shaft is extended exceeds a threshold.

2. The photographic monopod of claim 1, wherein the shutter control switch is disposed on the grip.

3. The photographic monopod of claim 1, further including a proximity sensor configured to measure a density of individuals proximate to the photographic monopod and to transmit the measured density to the logic circuit,
wherein the logic circuit is further configured to disable the connection between the shutter control switch and the photographic device when the measured density exceeds a predetermined crowd pressure threshold.

4. The photographic monopod of claim 1, wherein the shaft extension sensor includes a potentiometer.

5. The photographic monopod of claim 1, wherein the shutter control switch is paired to the photographic device via a wireless connection and the shutter control switch controls the shutter of the photographic device via the wireless connection.

6. The photographic monopod of claim 5, wherein the wireless connection is a Bluetooth connection.

7. The photographic monopod of claim 5, wherein the logic circuit disables the connection between the shutter control switch and the photographic device by deactivating the wireless connection.

8. The photographic monopod of claim 1, wherein the threshold is received by the logic circuit over a wireless connection.

9. The photographic monopod of claim 8, wherein the threshold is transmitted by a facility within which the photographic monopod is located.

10. The photographic monopod of claim 1, wherein the threshold is received by the logic circuit from the photographic device.

11. The photographic monopod of claim 1, wherein the threshold is received by the logic circuit from a device installed within a facility that the photographic monopod is operated within.

12. The photographic monopod of claim 1, wherein the photographic device is a smartphone.

13. The photographic monopod of claim 1, further comprising a geolocation device for determining a present geolocation of the monopod, wherein the logic circuit selects the threshold based on the present geolocation of the monopod as determined by the geolocation device.

14. The photographic monopod of claim 13, wherein the geolocation device is disposed within the photographic device.

15. A photographic monopod, comprising:
- an extendable shaft;
- a bracket for fixing a photographic device at a first end of the extendable shaft;
- a grip at a second end of the extendable shaft, opposite to the first end of the extendable shaft;
- a shaft extension sensor for sensing a degree to which the extendable shaft is extended; and
- a logic circuit for receiving a threshold value, receiving the degree to which the extendable shaft is extended from the shaft extension sensor, and generating an alert when the degree to which the extendable shaft is extended exceeds the received threshold value.

16. The photographic monopod of claim 15, wherein the logic circuit receives the threshold value over a wireless connection.

17. The photographic monopod of claim 15, wherein the logic circuit receives the threshold value via a manual input.

18. The photographic monopod of claim 15, wherein the logic circuit receives the threshold value based on a present geolocation of the photographic monopod.

19. The photographic monopod of claim 15, wherein the logic circuit additionally locks the extendable shaft from extending further when the degree to which the extendable shaft is extended exceeds the received threshold value.

20. The photographic monopod of claim 15, wherein the logic circuit additionally prevents the photographic device from capturing an image when the degree to which the extendable shaft is extended exceeds the received threshold value.

21. A method for controlling a camera function within a smartphone, comprising:
- mounting the smartphone to an end of an extendable shaft;
- sensing an extent to which the extendable shaft has been extended;
- transmitting an indication of the extent to which the extendable shaft has been extended to a logic circuit of the extendable shaft; and
- preventing the smartphone from capturing an image when it is determined, by the logic circuit, that the extent to which the extendable shaft has been extended exceeds a threshold.

* * * * *